March 28, 1944.  J. BRENZINGER  2,345,320
ART OF PRESERVING COFFEE
Filed April 21, 1942

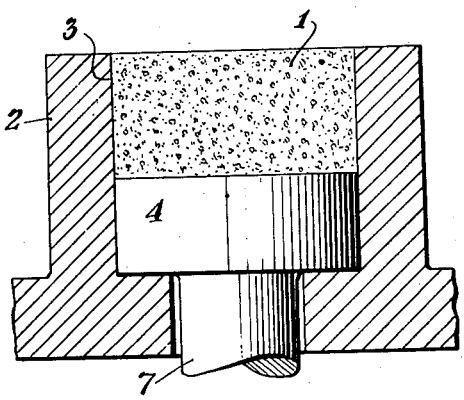

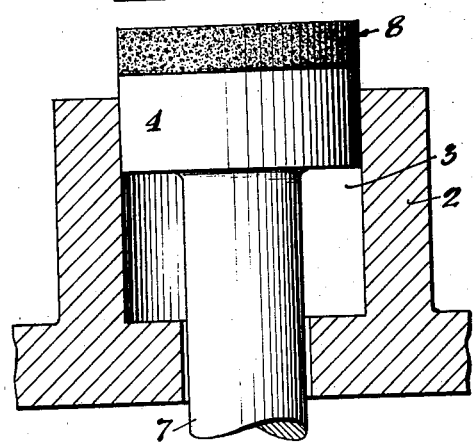

INVENTOR.
Julius Brenzinger
BY
ATTORNEY

Patented Mar. 28, 1944

2,345,320

UNITED STATES PATENT OFFICE 2,345,320

ART OF PRESERVING COFFEE

Julius Brenzinger, Fairfield, Conn., assignor to The Max Ams Machine Company, Bridgeport, Conn., a corporation of Connecticut Application April 21, 1942, Serial No. 439,844

2 Claims. (Cl. 99—152)

This invention relates to the art of preserving the desirable qualities of ground coffee.

It has been, for a long time, the custom to pack ground coffee in containers and to vacuumize the packed containers before sealing them. So long as containers of proper material could be obtained and the containers adequately sealed, such method has been fairly, though not entirely, successful. But now the art is confronted with a condition in which it may not be possible to use substantially air-tight containers and the object of this invention is to overcome this difficulty by so treating ground coffee that prevention of exposure to air is no longer so important as formerly.

In the accompanying drawing the invention is disclosed in a concrete and preferred form in which Fig. 1 is a vertical sectional view through a mold having a mold chamber with which is associated two pistons, the parts being shown at the beginning of the operation;

Figure 1:
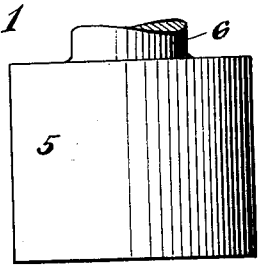
Figure 3:
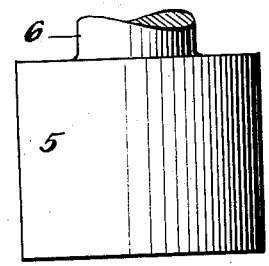
Fig. 3 is a view similar to Figs. 1 and 2, but showing the parts in the position they occupy after the cake has been produced and in the act of being ejected from the mold chamber.
Figure 2:
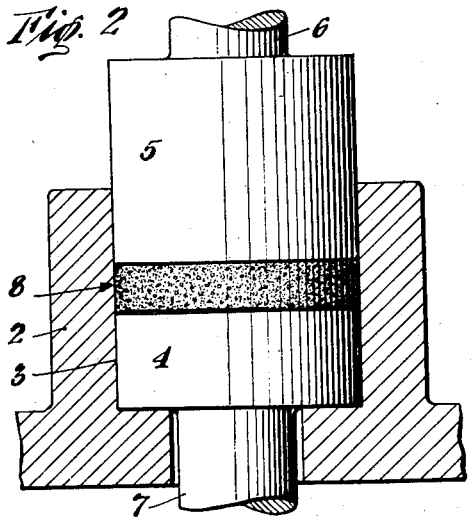
Fig. 2 is a view similar to Fig. 1, but showing the ground coffee compressed into a cake.
Figure 5:
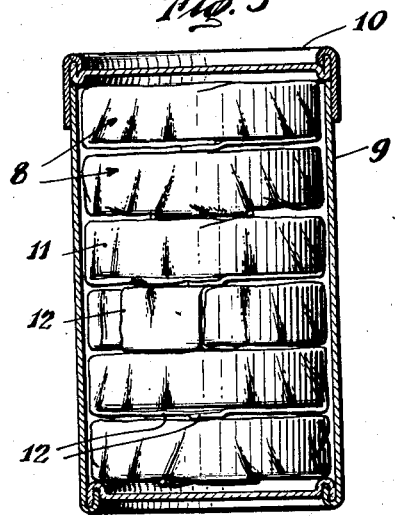
Fig. 5 is a vertical sectional view through a container in which a number of the cakes are placed.
Figure 4:
Fig. 4 is a perspective view of a cake enclosed and sealed in an envelope of thermoplastic material.

The mass of coffee 1, ground to a fineness of that customarily employed in making drip coffee, is placed in a mold 2, having a mold chamber 3. 4 indicates a piston constituting the bottom of the mold chamber and constituting also an ejecting member for the compressed cake to be produced. 5 indicates a second piston opposite to the first one to compress the mass of ground coffee against the first piston 4. Suitable means are provided, here indicated by plunger 6, to move the second piston 5 into the mold chamber toward the first piston 4 while the latter is stationary and in its lowermost position and to thereafter move said second piston 5 out of the mold chamber. Suitable means, here indicated by plunger 7, are provided to move the first piston 4 to eject the compressed cake 8 out of the mold chamber and thereafter to move said first piston 4 back into the mold chamber to receive another charge of ground coffee.

I have found that, by subjecting the ground coffee to a pressure of the order of forty to eighty tons to the square inch, the ground coffee is converted into a cake or compacted mass 8 that is inherently capable of sustaining itself against collapse and having a reluctance to expand when the surface thereof is subjected to the action of air at room, or lower, temperature. No binder material is used in compacting or compressing the ground coffee and it should be pointed out that the operation described goes beyond the attempt to merely remove the greater portion of the air between the particles in that it seems to render said particles inert, as it were, a condition in which, at room temperature, practically no expansion of the particles of the cake takes place and it is therefore possible to pack a plurality of said cakes 8 in a container 9, of a size substantially devoid of space permitting expansion of the cakes. The result is that, even if such container 9 and its cover 10 are not made of very substantial material and are not perfectly sealed, there appears to be no tendency to disrupt the container or to separate the cover from the container, even when said cover is not securely fastened as by double seaming and soldering to the container. If desired, each cake may be enclosed in a suitable envelope as 11 having its flaps 12 sealed and this envelope will preferably be made of a flexible thermoplastic material such as regenerated cellulose material which, by the momentary application of heat, can be made to seal the cake quite effectively. The cake contained in envelope 11 may be sold separately or a number of such cakes in said envelopes may be placed in said container 9, in the manner previously described.

It has been found that coffee, treated in the manner above described, will, at room temperature or less than room temperature, keep its desirable qualities practically indefinitely.

The mold and mechanism, for compressing the coffee, herein disclosed is not claimed in the present application, but forms the subject matter of another application filed June 2, 1943, Ser. No. 489,336.

I claim:

1. The method of preserving the desirable qualities of ground coffee which consists in: subjecting the ground coffee to pressure of the order of forty to eighty tons to the square inch to thereby compact the mass into a coherent cake inherently capable of sustaining itself against collapse when pressure is removed, and the particles of which are inert and have a reluctance to expand when said cake is subjected to the action of air at room, or lower, temperature.

2. In the art of preserving coffee, that step which consists in subjecting ground coffee to pressure of the order of forty to eighty tons to the square inch.

JULIUS BRENZINGER.